United States Patent
Stewart et al.

(10) Patent No.: US 7,626,826 B2
(45) Date of Patent: Dec. 1, 2009

(54) EXPANSION CARD CARRIER AND METHOD FOR ASSEMBLING THE SAME

(75) Inventors: Thomas E. Stewart, San Diego, CA (US); Mark H. Chen, Palo Alto, CA (US); Alan L. Winick, Meadow Vista, CA (US); Michael S. White, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 166 days.

(21) Appl. No.: 11/700,621

(22) Filed: Jan. 31, 2007

(65) Prior Publication Data

US 2008/0180897 A1 Jul. 31, 2008

(51) Int. Cl.
*H05K 5/00* (2006.01)

(52) U.S. Cl. .................. 361/756; 361/684; 361/752; 361/796

(58) Field of Classification Search ......... 361/752–756, 361/737, 683–686, 800–802, 690, 695, 796 361/797; 439/157–160, 377
See application file for complete search history.

(56) References Cited

U.S. PATENT DOCUMENTS

| | | | | | |
|---|---|---|---|---|---|
| 3,704,394 | A | * | 11/1972 | Johnson | 361/802 |
| 3,810,433 | A | * | 5/1974 | Posner | 211/41.17 |
| 4,131,933 | A | * | 12/1978 | Agard et al. | 361/801 |
| 4,796,159 | A | * | 1/1989 | Miksche | 361/832 |
| 5,121,296 | A | * | 6/1992 | Hsu | 361/685 |
| 5,149,276 | A | * | 9/1992 | Dixon | 439/159 |
| 5,338,214 | A | * | 8/1994 | Steffes et al. | 439/160 |
| 5,389,000 | A | * | 2/1995 | DiViesti et al. | 439/157 |
| 5,477,631 | A | * | 12/1995 | Hewitt | 40/605 |
| 5,507,658 | A | * | 4/1996 | Ho | 439/159 |
| 5,519,577 | A | * | 5/1996 | Dudas et al. | 361/737 |
| 5,542,854 | A | * | 8/1996 | Bowen | 439/157 |
| 5,544,006 | A | * | 8/1996 | Radloff et al. | 361/683 |
| 5,634,803 | A | * | 6/1997 | Cheng et al. | 439/157 |
| 5,651,202 | A | * | 7/1997 | Hewitt | 40/605 |
| RE35,873 | E | * | 8/1998 | Simmons et al. | 361/818 |
| 5,815,377 | A | * | 9/1998 | Lund et al. | 361/802 |
| 5,846,095 | A | * | 12/1998 | Bowen | 439/157 |
| 5,863,213 | A | * | 1/1999 | Enomoto et al. | 439/326 |
| 5,934,941 | A | * | 8/1999 | Hirai et al. | 439/607 |
| 5,996,962 | A | * | 12/1999 | Chang et al. | 248/694 |
| 6,030,238 | A | * | 2/2000 | Dong | 439/159 |
| 6,053,760 | A | * | 4/2000 | Bailis et al. | 439/377 |
| 6,056,566 | A | * | 5/2000 | Nakamura et al. | 439/159 |

(Continued)

*Primary Examiner*—Dean A. Reichard
*Assistant Examiner*—Xiaoliang Chen
(74) *Attorney, Agent, or Firm*—Osha • Liang LLP

(57) ABSTRACT

An expansion card carrier is disclosed, the expansion card carrier including a top portion for covering an expansion card, at least one side portion for supporting the top portion, and at least one pair of card guides for allowing an expansion card to slide along into the expansion card carrier. A method for assembling an expansion card carrier is also disclosed, the method including casting a panel including a top portion for covering an expansion card and at least one side portion for supporting the top portion, forming at least one side portion by deforming the panel, and attaching at least one pair of card guides inside the expansion card carrier for allowing an expansion card to slide along into the expansion card carrier.

12 Claims, 6 Drawing Sheets

U.S. PATENT DOCUMENTS

| | | | |
|---|---|---|---|
| 6,056,579 A * | 5/2000 | Richards et al. | 439/358 |
| 6,078,504 A * | 6/2000 | Miles | 361/727 |
| 6,166,324 A * | 12/2000 | Oldendorf et al. | 174/377 |
| 6,174,192 B1 * | 1/2001 | Watanabe et al. | 439/377 |
| 6,185,093 B1 * | 2/2001 | Moss | 361/684 |
| 6,368,126 B1 * | 4/2002 | Lee | 439/160 |
| 6,496,385 B1 * | 12/2002 | Smithson et al. | 361/801 |
| 6,667,890 B1 * | 12/2003 | Barringer et al. | 361/752 |
| 6,717,901 B2 * | 4/2004 | Maeno et al. | 720/672 |
| 6,840,807 B2 * | 1/2005 | Ooya et al. | 439/630 |
| 6,908,322 B1 * | 6/2005 | Bricaud et al. | 439/152 |
| 6,932,654 B2 * | 8/2005 | Washino | 439/630 |
| 6,934,161 B2 * | 8/2005 | Kim et al. | 361/752 |
| 6,976,879 B2 * | 12/2005 | Shishikura et al. | 439/630 |
| 7,077,705 B2 * | 7/2006 | Harasawa | 439/630 |
| 7,170,742 B2 * | 1/2007 | Na et al. | 361/684 |
| 7,173,826 B1 * | 2/2007 | Chiou et al. | 361/737 |
| 7,255,603 B2 * | 8/2007 | Kato et al. | 439/630 |
| 7,309,259 B2 * | 12/2007 | Sun et al. | 439/630 |
| 7,364,820 B2 * | 4/2008 | Tanaka et al. | 439/633 |
| 2002/0053122 A1 * | 5/2002 | Jalanti et al. | 29/428 |
| 2002/0076959 A1 * | 6/2002 | Lee | 439/160 |
| 2002/0081890 A1 * | 6/2002 | Obermaier | 439/377 |
| 2002/0118510 A1 * | 8/2002 | Hutchison et al. | 361/692 |
| 2003/0043553 A1 * | 3/2003 | Barringer et al. | 361/756 |
| 2003/0043564 A1 * | 3/2003 | Barringer et al. | 361/807 |
| 2003/0045155 A1 * | 3/2003 | Barringer et al. | 439/377 |
| 2003/0058614 A1 * | 3/2003 | Na et al. | 361/686 |
| 2003/0117768 A1 * | 6/2003 | Marcotte et al. | 361/600 |
| 2003/0128533 A1 * | 7/2003 | Barringer et al. | 361/800 |
| 2004/0004824 A1 * | 1/2004 | Serjak et al. | 361/796 |
| 2005/0195581 A1 * | 9/2005 | Chiou et al. | 361/752 |
| 2007/0202732 A1 * | 8/2007 | Yahiro et al. | 439/326 |

* cited by examiner

EXPANSION CARD CARRIER AND METHOD FOR ASSEMBLING THE SAME

BACKGROUND OF INVENTION

1. Field of the Invention

The invention relates to a carrier on a computer server for an expansion card and a method for assembling the same.

2. Background Art

An expansion card is a circuit board which is designed to extend or supplement the functionality of a mainboard in a computer. Sometimes, it is also used to modify and update the basic functionality of a mainboard. For example, when new features for a processor in a mainboard are developed, it could be advantageous in cost and time to plug an expansion card containing the newly developed features into a special port or connector on the mainboard rather than to completely re-design the previous processor.

As an example of such an expansion card, there is Advanced Mezzanine Card in the pertinent art, which can be abbreviated as AdvancedMC or AMC. Advanced Mezzanine Card is a printed circuit board (PCB) that follows the specifications of the PCI Industrial Computers Manufacturers Group (PICMG). Advanced Mezzanine Card, which meets the PICMG industrial standards, can be used as an expansion card to provide extended functionalities such as DSP and network communications to a blade server. A blade server is ideal for specific purposes such as web hosting and cluster computing.

A blade server is designed to have a chassis for housing a number of individual circuit boards, each having one or more processors, memory, storage, and network connections, but sharing, for example, a power supply and air-cooling resources (e.g., fans) of the chassis. Those skilled in the art will recognize that one of the aims in using a blade server is to be able to place many blades in a single chassis, thereby compacting increased computing power in an area less than that which would be necessary were each of the blades individually housed.

Because such a blade server aims to provide fundamental computing functions with space-efficiency, an expansion card may sometimes be needed, for example, to supplement storage, network connectivity, and image and sound information processing performance. An expansion card is typically added to a computer after being accommodated in a carrier and plugged into a connector. An expansion card carrier retains an expansion card inside and keeps the expansion card electrically connected to a socket in the connector.

FIG. 1A illustrates a conventional expansion card assembly 100. Typically, expansion card assembly 100 is inserted in the longitudinal direction into an expansion card carrier (not shown). An expansion card 130 can may contain necessary circuitry such as arithmetic processors, information processing units, and network communication processors.

A pin array 135 is provided along the rear edge of expansion card 130. Pin array 135 can be electrically mated with a connector (not shown) on a mainboard of a computer upon insertion. A handle 110 is a leverage which can help a user grab, move, insert, or remove expansion card assembly 100. On a faceplate 120, indicators such as LEDs and labels may be provided for users' convenience.

Referring next to FIG. 1B, three expansion card assemblies 102, 104, 106 are inserted into an expansion card carrier 105. The left two of expansion card assemblies 102, 104 are single-width expansion card assemblies whereas the rightmost expansion card assembly 106 is a double-width expansion card assembly. As can be seen in FIG. 1B, expansion card assembly 106 is twice the size of expansion card assemblies 102, 104. An ejecting mechanism 170 functions to lock the inserted expansion card assemblies to carrier 105 and, after use, to help the expansion card assembly easily to be released from carrier 105.

FIG. 2A is a perspective view of an exploded expansion card carrier 205 in the prior art. A covering panel 210 covers the entire carrier from the top. Card guides 250 have a groove 251 which can guide an expansion card (not shown) to be inserted into the proper position of carrier 205 and to be mated appropriately with a connector 294. On upper portions of card guides 250, protruding tabs 254 are formed to make card guides 250 secured to covering panel 210. Receptacles 214 in covering panel 210 are dimensioned to accept and latch protruding tabs 254 so that card guides 250 can be fixed to covering panel 210. Struts 257 support card guides 250 and covering panel 210 on a bottom panel 220.

FIG. 2B illustrates a card guide in further detail. In this type of card guide 255, two grooves 257, 259 are formed to accept and retain two expansion cards. Protruding tabs 254' provides a fastening mechanism as explained with reference to FIG. 2A. A strut 258' is a means for supporting card guide 255 on a bottom panel. In addition, strut 258' is used as a means for supporting a cover panel on a bottom panel in the same manner as explained referring to FIG. 2A.

SUMMARY OF INVENTION

One or more embodiments of the present invention provide an improved expansion card carrier made of less castings, thereby making the card carrier easier to assemble. One or more embodiments of the present invention provide an efficient method for assembling an expansion card carrier. One or more embodiments of the present invention provide a sturdier structure of expansion card carrier.

In general, in one aspect, embodiments disclosed herein relate to an expansion card carrier, the expansion card carrier including: a top portion for covering an expansion card; at least one side portion for supporting the top portion; and at least one pair of card guides for allowing an expansion card to slide along into the expansion card carrier.

In another aspect, embodiments disclosed herein relate to a method for assembling an expansion card carrier, the method including: casting a panel including a top portion for covering an expansion card and at least one side portion for supporting the top portion; forming at least one side portion by deforming the panel; and attaching at least one pair of card guides inside the expansion card carrier for allowing an expansion card to slide along into the expansion card carrier.

Other aspects and advantages of the invention will be apparent from the following description and the appended claims.

DETAILED DESCRIPTION

Exemplary embodiments of the invention will be described with reference to the accompanying figures. Like items in the figures are shown with the same reference numbers.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Embodiments of the invention relate to a carrier on a computer for an expansion card. Also, one or more embodiments of the invention relate to a method for assembling and mounting a carrier on a computer.

Figure 1A:
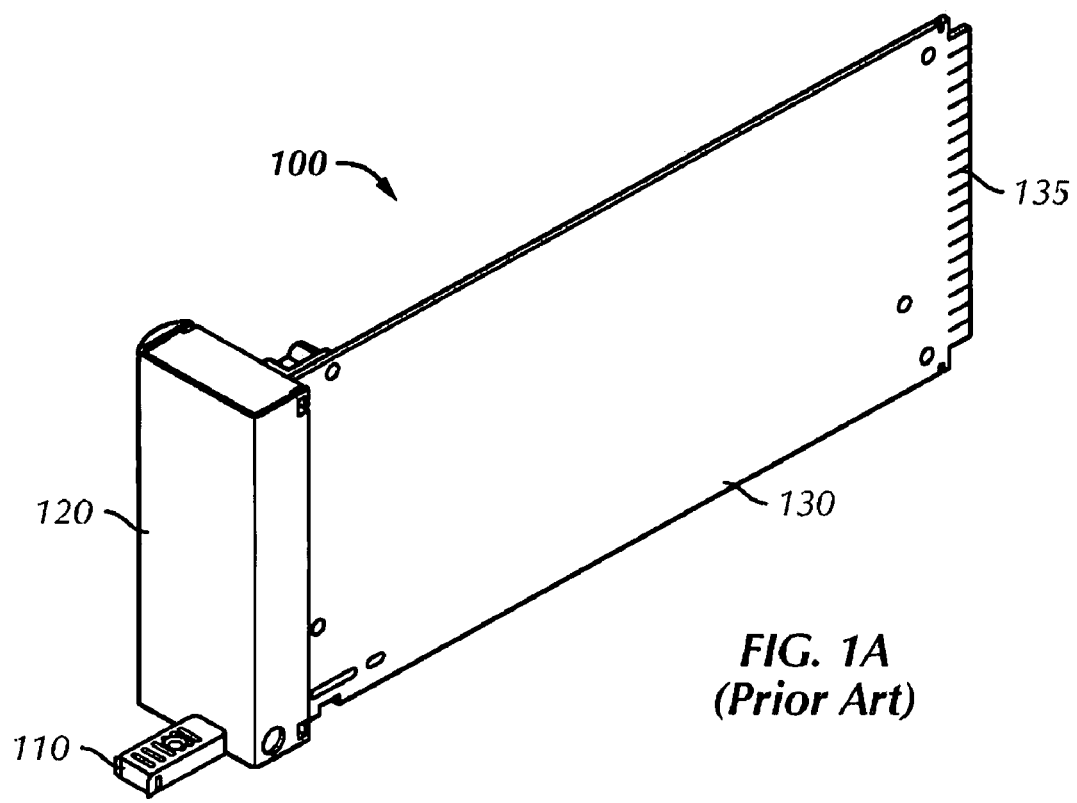
FIG. 1A shows a perspective view of a conventional expansion card.
Figure 1B:
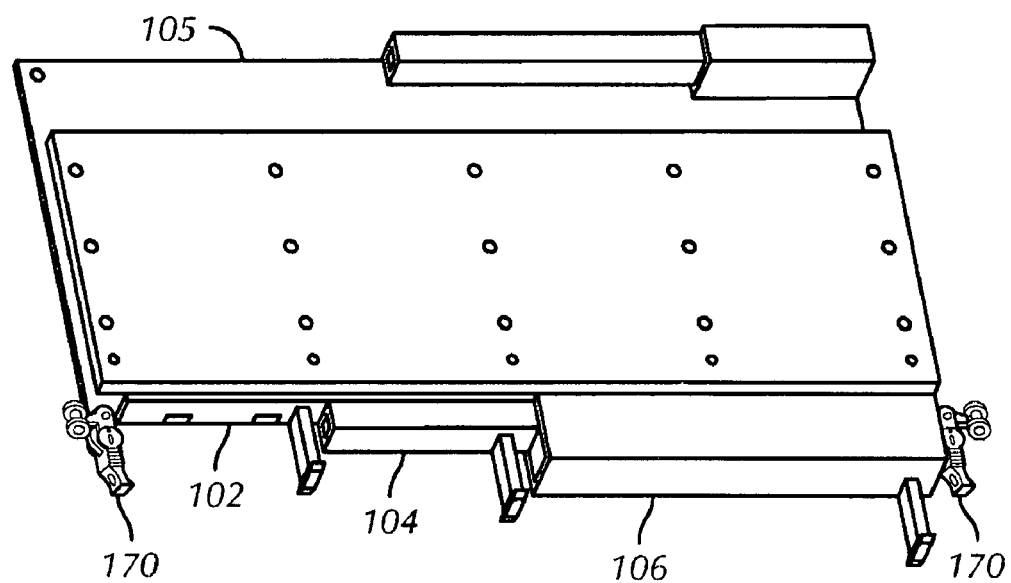
FIG. 1B shows a perspective view of a conventional expansion card carrier.
Figure 2A:
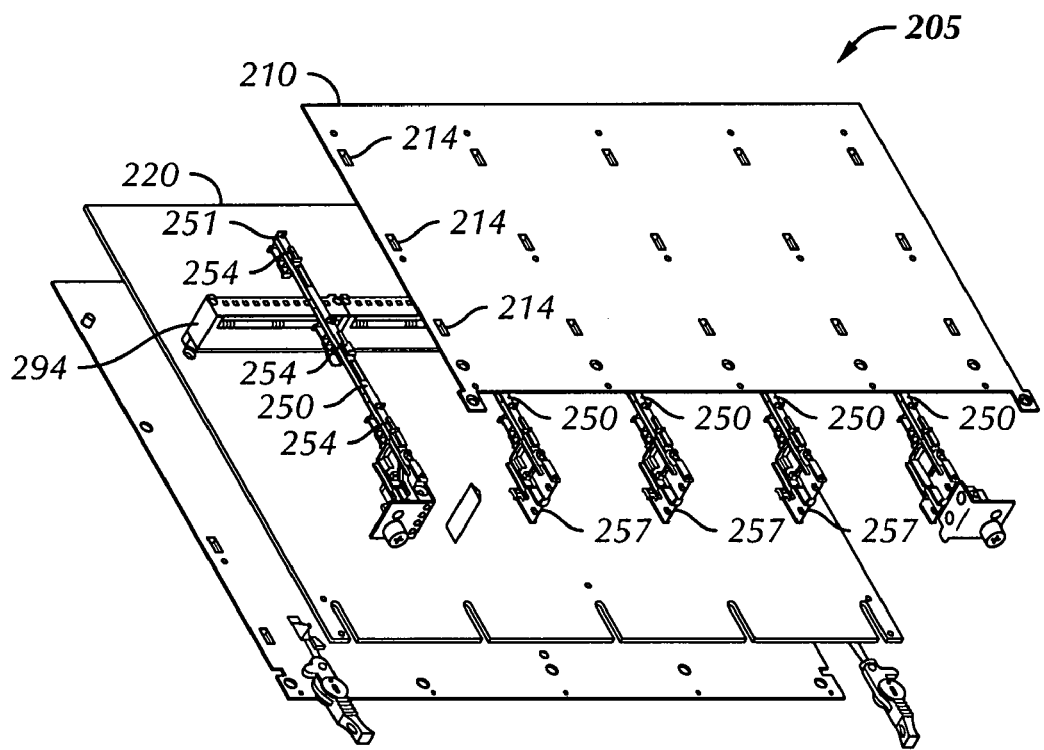
FIG. 2A shows an exploded view of a conventional expansion card carrier.
Figure 2B:
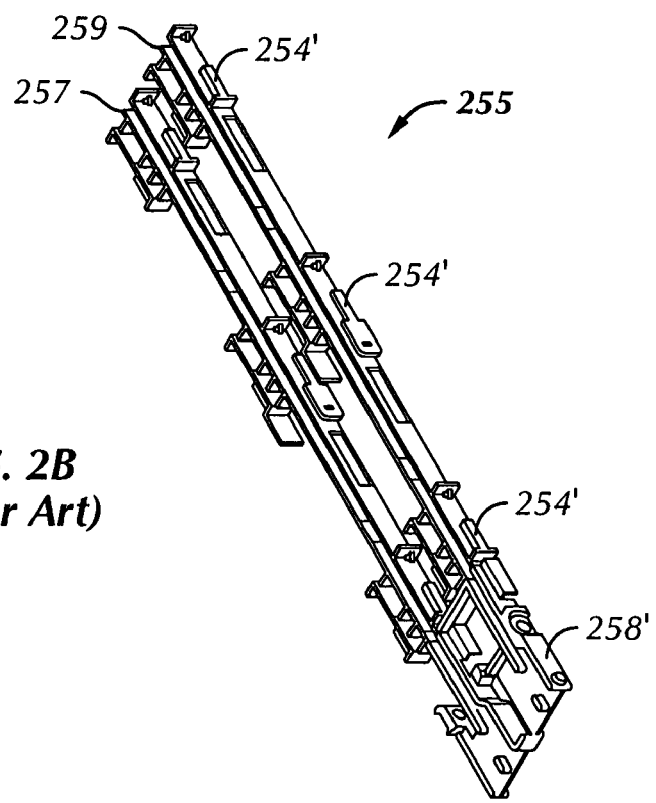
FIG. 2B shows a perspective view of a card guide.
Figure 3:
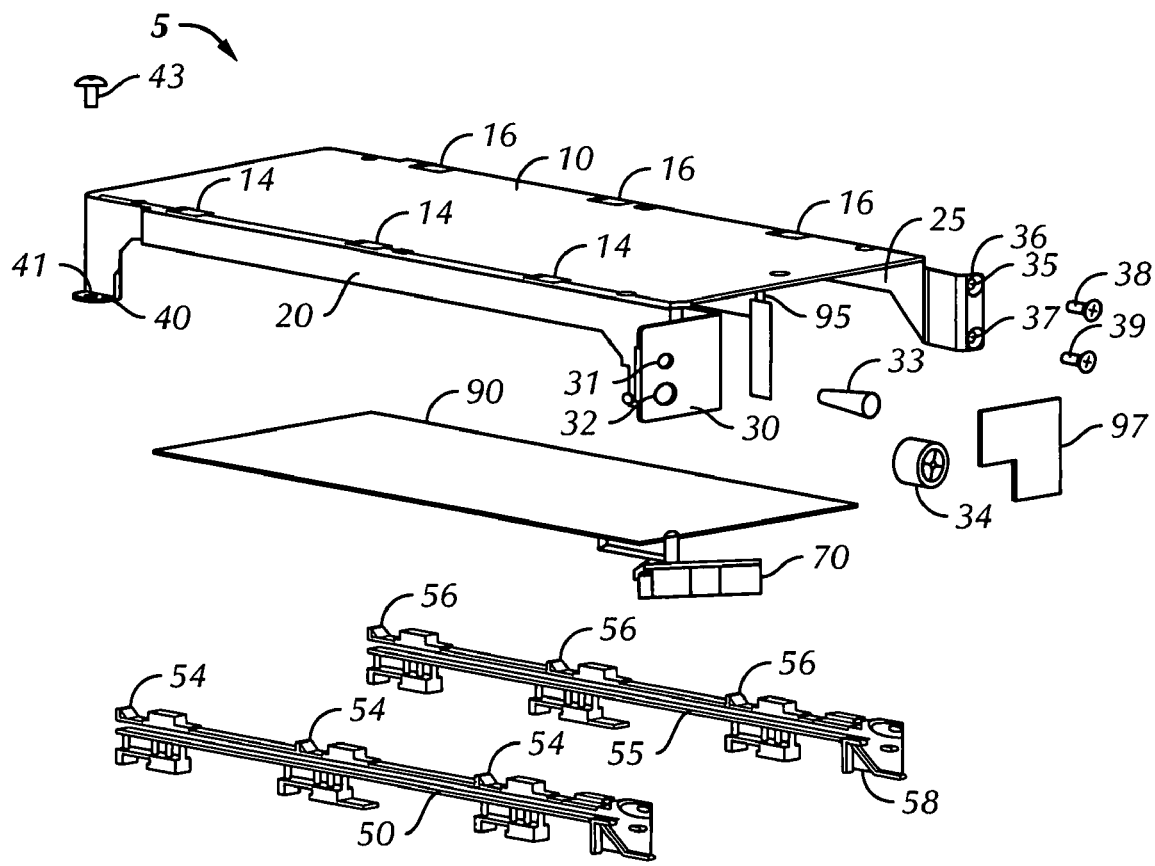
FIG. 3 shows an exploded perspective view of an expansion card carrier according to one embodiment of the present invention.
Figure 4A:
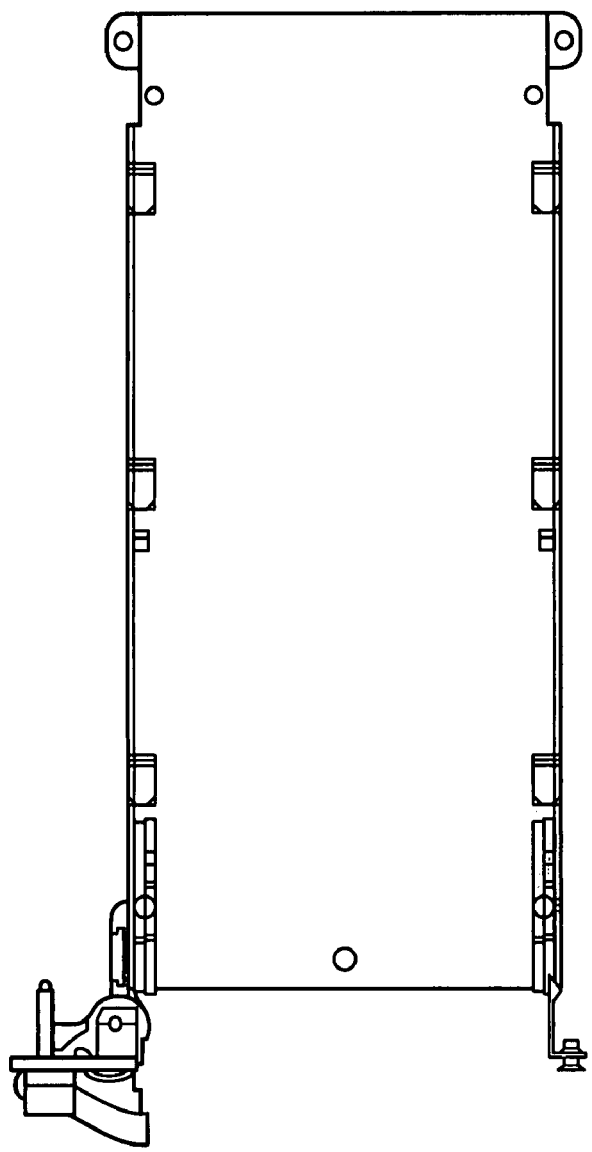
FIG. 4A shows a top view of an expansion card carrier according to one embodiment of the present invention.
Figure 4B:
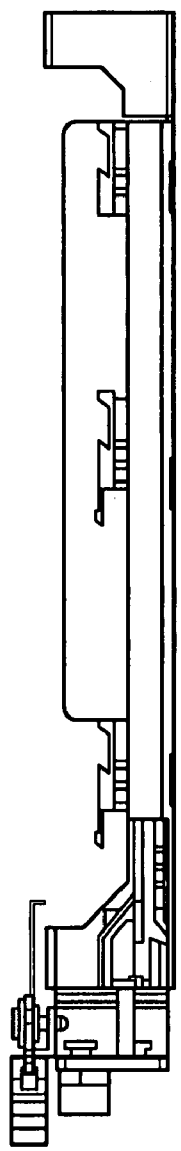
FIG. 4B shows a left side view of an expansion card carrier according to one embodiment of the present invention.
Figure 4C:
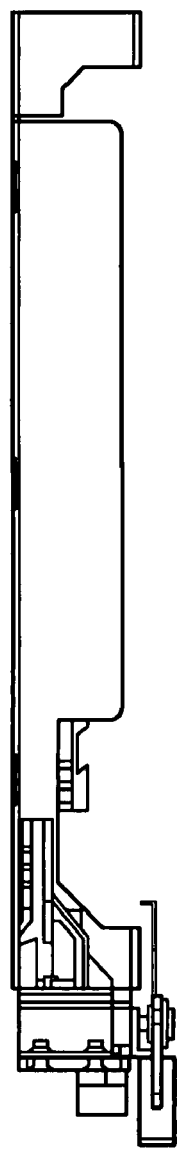
FIG. 4C shows a right side view of an expansion card carrier according to one embodiment of the present invention.
Figure 4D:
FIG. 4D shows a front view of an expansion card carrier according to one embodiment of the present invention.

Referring to FIG. 3, an exploded view of an expansion card carrier according to one or more embodiments of the present invention is shown. It is noted that side portions 20, 25 are formed monolithically with a top portion 10. Advantageously, top portion 10 and side portions 20, 25 are manufactured as a single casting. For example, top portion 10 and side portions 20, 25 are cast as a single piece of panel.

Moreover, securing portions 30, 35, 40 may be formed monolithically with side portions 20, 25 and/or with top portion 10. In the embodiment shown, securing portions 30, 35 are formed in the front part of carrier 5, and securing portions 40 and 45 are formed in the rear part of carrier 5.

In each securing portion, at least one means for mounting carrier 5 onto a mainboard (not shown) is provided. In one or more embodiments, at least one screw and at least one corresponding hole are provided in each securing portion. In FIG. 3, screws 33, 34, 38, 39, and 43 fasten carrier 5 onto a mainboard (not shown) and/or a blade computer (not shown) through holes 31, 32, 36, 37, and 41, respectively. Other means for mounting carrier 5 includes, but not limited to, tabs and receptacles, clamps, weld, solder, and adhesive.

In addition, an insulator 90 may be provided below top portion 10 in order to prevent possible short-circuiting between top portion 10 and an expansion card (not shown). For example, insulating material such as polyester film and acrylic film can be used as an insulator.

Further, at least one pair of card guides are provided inside carrier 5. The pair of card guides 50, 55 can allow an expansion card (not shown) to slide along into carrier 5. The pair of card guides 50, 55 may be attached onto top portion 10 and/or side portions 20, 25 by an appropriate fastening mechanism. In an embodiment where the pair of card guides 50, 55 are attached onto top portion 10, each of the pair of card guides 50, 55 may be attached onto each lateral edge inside top portion 10. In the embodiment shown in FIG. 3, a plurality of tabs 54, 56 are protruded from top portions of the pair of card guides 50, 55. When assembled, tabs 54, 56 fit into receptacles 14, 16 provided in top portion 10, respectively, and are latched to fasten card guides 50, 55 to top portion 10. Alternatively, receptacles may be formed in side portions 20, 25 in an appropriate manner to fasten card guides to side portions 20, 25. Also, one or more struts 58 may be used to support the pair of card guides 50 on a mainboard (not shown).

Additionally, an ejector assembly 70 may be provided with an expansion card carrier according to an embodiment of the present invention. Ejector assembly 70 is a mechanism for facilitating insertion, latching, and ejection of an expansion card within carrier 5. Ejector assembly 70 may be compliant with the PICMG 3.0 standard. Also, a label 97 is attached on a front portion of carrier 5. On the surface of label 97, information such as directions, warnings, logos, models, etc., which may be necessary to users, is indicated. A gasket 95 may be attached inside carrier 5 to prevent carrier 5 from being affected by external vibration.

Figure 5:
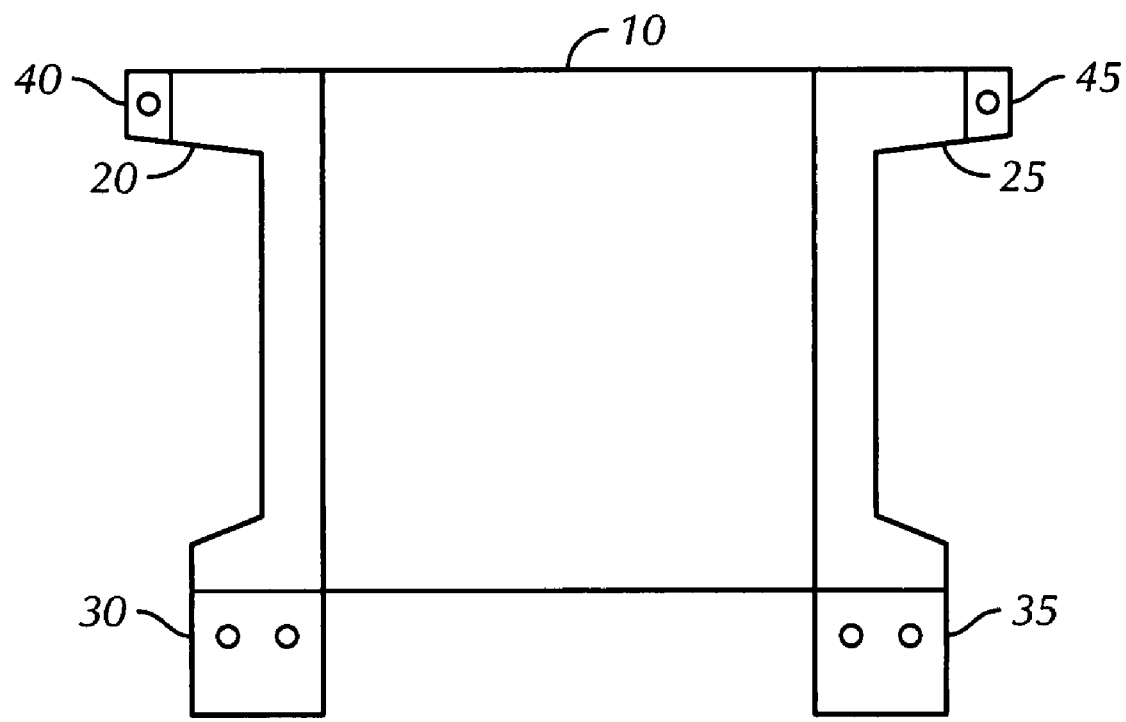
FIG. 5 shows a top view of a piece of panel having a top portion and side portions according to one embodiment of the present invention.

Shown in FIGS. 4A-4D are a top view, a left side view, a right side view, a front view, respectively, of an assembled expansion card carrier according to one or more embodiments of the present invention. Further, FIG. 5 shows a top view of a single piece of panel having a top portion and side portions according to one embodiment of the present invention. In one or more embodiments, the single piece of panel is manufactured as a single casting. In one or more embodiments of the invention, side portion 20 is formed by bending the panel downwardly along the boundary line between top portion 10 and side portion 20 by an appropriate angle, for example, by a right angle. Likewise, side portion 25 is formed by bending the panel downwardly along the boundary line between top portion 10 and side portion 25, for example, by the right angle. The boundary lines between top portion 10 and side portions 20, 25 are defined as being so wide that top portion 10 can cover an expansion card (not shown). By the bending motion as described above, side portions 20, 25 may be substantially perpendicular to and monolithic with top portion 10. Further, securing portions 30, 35, 40, 45 are formed by bending the panel upwardly along the boundary lines between side portions 20, 25 and securing portions 30, 35, 40, 45, for example, by a right angle. A panel according to one or more embodiments of the invention may be a solid sheet that can be bent by exerting pressure. The panel may be made of a metal, for example, aluminum.

One or more embodiments of the invention may follow necessary industrial standards. For example, the detailed dimensions and considerations of the carriers as explained above may comply with the PICMG 3.0 standard and the AdvancedMC standard. Specifically, one embodiment of the invention may be a single-width full-height AMC card carrier. Another embodiment of the invention may be a double-width full-height AMC card carrier.

Figure 6:
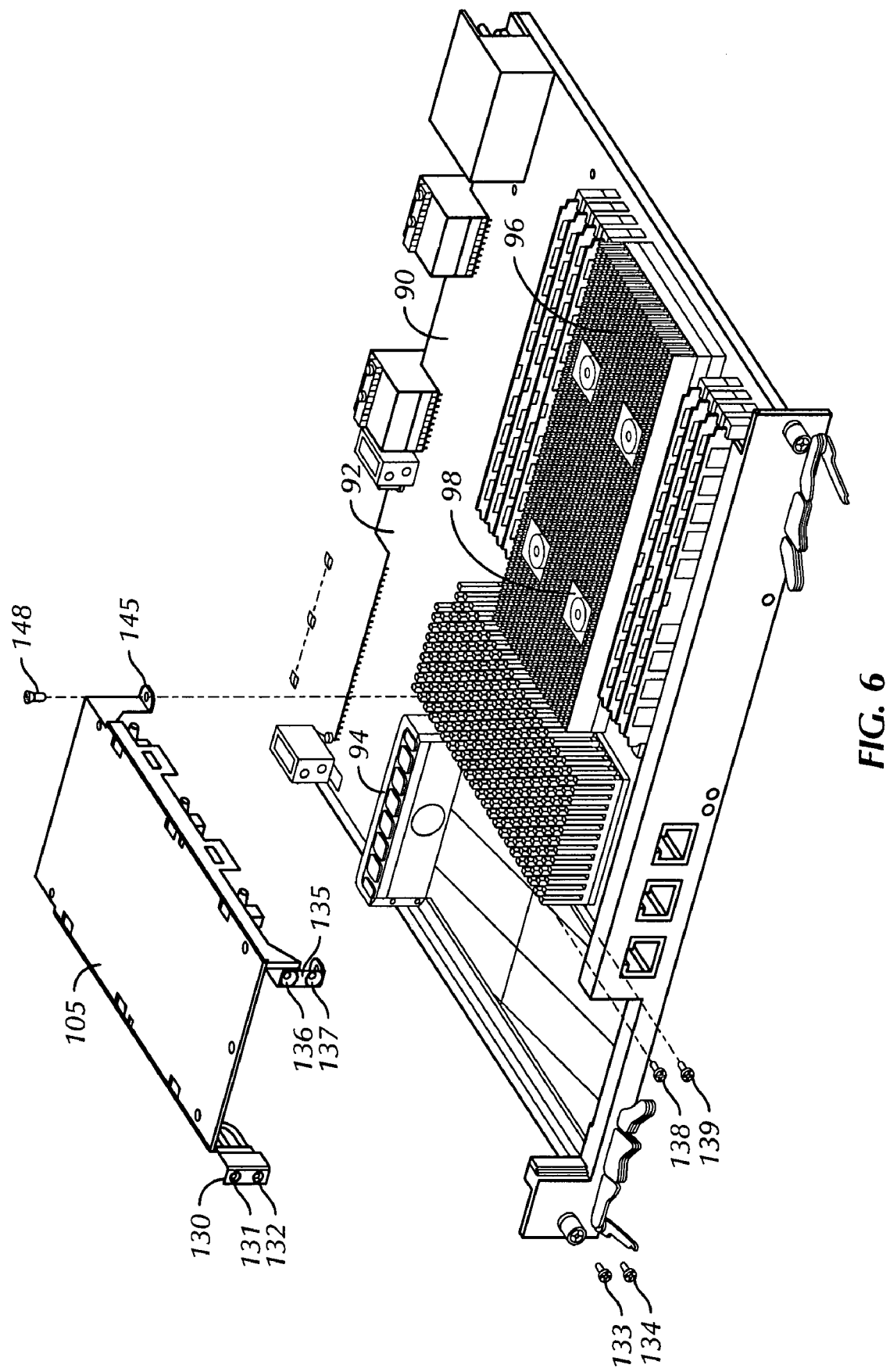
FIG. 6 shows a perspective view of an expansion card carrier and a blade computer according to one embodiment of the present invention.

FIG. 6 illustrates a way to mount an expansion card carrier on a mainboard of a blade server in accordance with one or more embodiments of the present invention. An assembled expansion card carrier 105 is mounted on a mainboard 92 of a blade server 90. Carrier 105 is fixed on mainboard 92 by means of suitable mounting mechanisms. In this embodiment, screws 133, 134, 138, 139, 148 fix securing portions 130, 135, 145 through holes 131, 132, 136, 137, 145 on main board 92. Blade server 90 includes other components for necessary operations such as a processor 96, a memory device 98, and a connector 94. After mounting carrier 105 on mainboard 92, an expansion card is inserted through the clearance in the front of carrier 105 and is connected electrically to connector 94 so that the expansion card can function properly with circuitry of mainboard 92.

One or more embodiments of the invention may include one or more of the following advantages. Embodiments can provide an expansion card carrier with low cost and manufacturing time. A robust structure of expansion card in accordance with embodiments of the invention may not only increase the top-mounting area strength, but also satisfy various national earthquake standards such as GR 63-CORE. Embodiments of the invention are formed without many separate components or many joints, which reduces assembly time. One or more embodiments are less adverse to external shock or pressure than conventional carriers.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An expansion card carrier, comprising:
    a top portion for covering an expansion card;
    at least one side portion for supporting the top portion, wherein the at least one side portion extends from the top portion perpendicularly to a surface of the top portion and is formed by deforming a panel comprising the top portion and the at least one side portion, and wherein the at least one side portion is integral with the top portion;
    at least one pair of card guides for allowing an expansion card to slide along into the expansion card carrier, wherein the at least one pair of card guides are provided inside the expansion card carrier, and
    at least one securing portion extends from the side portion and in parallel with the mainboard, and the at least one securing portion secures the expansion card carrier onto a mainboard;
    wherein other at least one securing portion extends from the at least one side portion perpendicular to the mainboard, and the other at least one securing portion secures the expansion card carrier onto a front panel disposed on the mainboard.

2. The expansion card carrier as claimed in claim 1, wherein the at least one side portion extends from the top portion onto a mainboard.

3. The expansion card carrier as claimed in claim 1, wherein the at least one side portion is formed by bending a single piece of cast panel comprising the top portion and the at least one side portion.

4. The expansion card carrier as claimed in claim 1, wherein the at least one pair of card guides are attached to each lateral edge of the top portion by means of a fastening mechanism.

5. The expansion card carrier as claimed in claim 4, wherein the fastening mechanism is at least one screw and at least one hole dimensioned to accept the screw.

6. The expansion card carrier as claimed in claim 4, wherein the fastening mechanism is at least one tab and at least one receptacle dimensioned to accept the tab.

7. The expansion card carrier as claimed in claim 1, wherein the at least one securing portion has a means for mounting the expansion card carrier onto the mainboard.

8. The expansion card carrier as claimed in claim 1, wherein the top portion, the at least one side portion, and the least one securing portion are formed by bending a single piece of cast panel.

9. The expansion card carrier as claimed in claim 1, wherein the card guides comprises at least one strut for supporting the card guides on a mainboard.

10. The expansion card carrier as claimed in claim 1, further comprising an ejector provided in the front of the expansion card carrier.

11. The expansion card carrier as claimed in claim 1, further comprising an insulator below the top portion for covering an expansion card.

12. A blade computer comprising:
    a processor;
    a memory device; and
    the expansion card carrier as claimed in claim 1 mounted on a mainboard of the blade computer.

* * * * *